June 24, 1941.   T. E. M. WHEAT   2,246,824
VEHICLE FRAME
Filed May 4, 1939    2 Sheets-Sheet 2

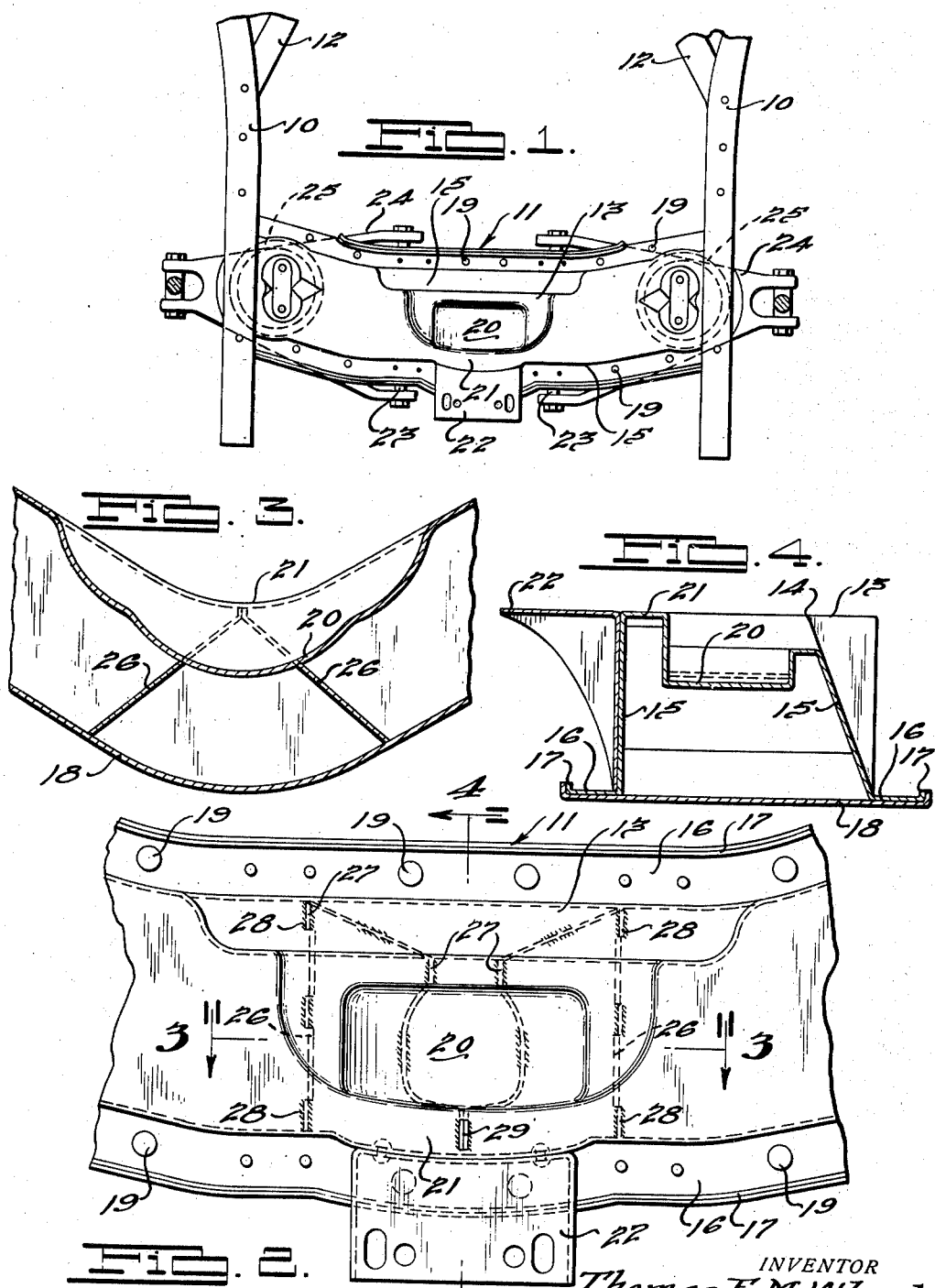

INVENTOR
Thomas E. M. Wheat.
BY
Harness, Dirid, Pate & Harris
ATTORNEYS.

Patented June 24, 1941

2,246,824

UNITED STATES PATENT OFFICE 2,246,824

VEHICLE FRAME

Thomas E. M. Wheat, Highland Park, Mich., assignor to Chrysler Corporation, Highland Park, Mich., a corporation of Delaware Application May 4, 1939, Serial No. 271,759

10 Claims. (Cl. 280—106)

This invention relates to motor vehicles and refers more particularly to improvements in chassis frames therefor.

An object of the invention is the provision of a frame structure having improved rigidity and resistance to torsional deflection while maintaining the weight thereof at a minimum.

A further object of the invention resides in the provision of a frame structure having improved transversely extending connecting and bracing means in the form of a cross member for the transversely spaced, longitudinally extending side rails or sills. One such connecting and bracing member is located at or near the forward end of the frame structure and forms a support for the vehicle engine. In vehicles employing the independently sprung type of wheel suspension, the inner ends of the wheel support linkages are supported from the cross member connecting the side rails. In the interest of economy of manufacture and lightness of weight, such a cross member preferably comprises a stamped or pressed metal structure which is preferably box shape in cross section to afford the maximum rigidity and strength while maintaining the weight thereof at a minimum. For frame structures particularly adapted for vehicles of the foregoing type, the aforesaid cross member is bowed to accommodate positioning of adjacent structures, such as the vehicle engine, with the result that angularly directed torsional stresses are introduced into the frame cross member. These stresses intersect at a point located approximately in the longitudinal central mid plane of the frame and tend to distort the cross member and particularly that portion of the latter registering with the aforesaid point of the frame.

A further feature of the invention therefore is to provide improved means for bracing and rigidifying a frame cross member of the above type. In carrying out the foregoing, the bracing means preferably lies across the line of the shear forces tending to distort the frame cross member.

More specifically, the invention has for its object the provision of improved means for strengthening a stamped or pressed metal box-like member which is particularly adapted for use in vehicle frame structures.

Other objects and advantages of the invention will be more apparent from the following description taken in connection with the accompanying drawings, in which:

Fig. 1 is a fragmentary top plan view of a vehicle frame structure embodying the invention.

Fig. 2 is an enlarged fragmentary top plan view of the cross member shown in Fig. 1.

Fig. 3 is a vertical sectional view taken as indicated by the line 3—3 of Fig. 2.

Fig. 4 is a vertical sectional view taken as indicated by the line 4—4 of Fig. 2.

Figure 5:
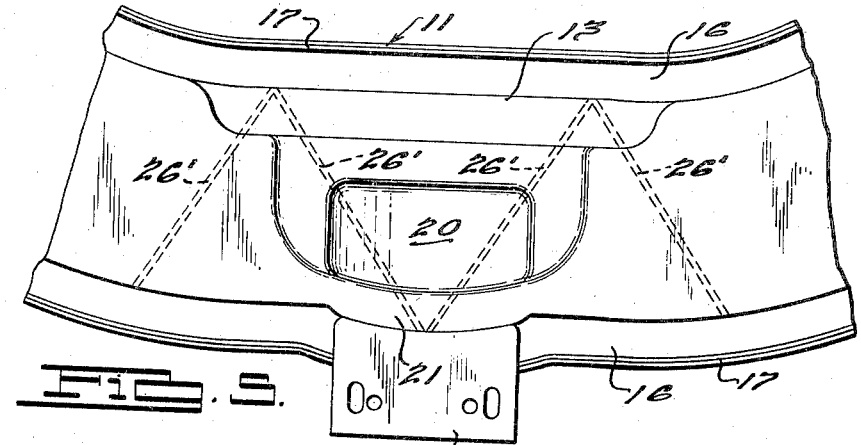
Fig. 5 is a view similar to Fig. 2 but illustrating a modified form of the invention.

Referring to the drawings and more particularly to Figs. 1 to 4 inclusive, the invention is illustrated and described in connection with a vehicle frame structure including longitudinally extending transversely spaced side rails or sills 10 which are connected adjacent the forwardly disposed ends thereof by a cross brace 11. Other connecting means such as an X-brace structure, portions of which are located at 12, may be employed for bracing and rigidifying the frame structure in the well-known manner. The cross brace 11 is of box-shape cross section as shown more particularly in Fig. 4 and includes a substantially channel shaped member 13. The web 14 and side flanges 15 thereof form three sides of the box. Each of the flanges 15 has a portion thereof extending laterally of the box as at 16 and terminates in a vertically extending extremity as indicated at 17. The bottom wall of the box is provided by a horizontally disposed plate 18 which abuts the flanges 16 and which has longitudinally extending side extremities abutting the corresponding extremities 17 of the side flanges 15. The member 13 and plate 18 are secured together by bolts 19 engaging the flanges 16 and the registering portion of the plate 18. The member 13 and plate 18 preferably comprise sheet metal stamped or pressed from a suitable piece of stock to the desired shape as illustrated.

The cross brace is bowed forwardly as indicated in Fig. 1 to accommodate positioning of the vehicle engine, not shown, and various other mechanisms associated therewith with respect to the frame structure. The mid portion of the cross member is bowed downwardly as shown more particularly in Figs. 3 and 4 to accommodate positioning of various parts of the vehicle engine, not shown, vertically with respect to the cross member. As indicated, a rearwardly disposed portion 20 of the cross member is bowed downwardly beyond the adjacent forwardly disposed portion 21, the latter serving as a rigidifying means. The portion 20 constitutes the main transverse area of the wall or web 14 as is shown in Fig. 4 and has a shorter radius of curvature than the adjacent bowed portion of the plate 18.

One advantage of providing a brace 11 of box-shape cross section is that the box may be of suitable dimensions to afford the necessary strength and rigidity for bracing purposes and may also be deformed as indicated at 20 and 21 to accommodate the various mechanisms associated with the vehicle engine, thereby permitting the forwardly disposed end of the latter to be positioned relatively lower than would otherwise be possible.

The cross brace 11 has secured thereto a bracket 22 which forms a support for parts of the engine cooling system such as a radiator core (not shown). Also carried by the cross member 11 is a pair of shafts 23 extending longitudinally of the frame structure, each of which has an articulated connection with a wishbone linkage 24. Each of the linkages 24 extends laterally beyond the frame structure and forms a support for a vehicle road wheel not shown, it being understood that the generally similar upper disposed linkage (not shown) is employed in conjunction with the lower linkage 24 and has the inner end thereof pivotally supported from the frame structure, preferably at the cross member 11. Suitable weight supporting springs such as the coil springs 25 are disposed between the lower linkage 24 and the cross member 11.

Various torsional and shear stresses are introduced into the cross member 11, these stresses having their origin in twisting of the frame structure due, for instance, to weaving of the body when the vehicle is rounding a curve. Some of the latter stresses, due to the bowed formation of the cross member, intersect at a point substantially mid way of the latter end in the region of the portions 20 and 21 thereof. Other stresses are introduced into the cross member by the wheel support means such as the linkages 24 and still other stresses arise through the action of the weight supporting springs 25.

It has been found desirable to provide means for reinforcing and rigidifying a cross member of the above type against the action of the various stresses as aforesaid and for this purpose I have provided a plurality of plate-like members preferably disposed substantially mid way of the longitudinal extremities of the cross brace and in substantially the longitudinal central mid plane of the frame structure. In the form of the invention illustrated in Figs. 1 to 4, I have shown a pair of oppositely inclined plates 26 which converge vertically and transversely with respect to the cross member. The lower-most edge portion of each plate has a plurality of integrally formed tabs 27 which extend through registering slits in the plates 18 and are secured thereto as by welding. The upper-most edge of each plate has a contour conforming to the contour of the adjacent portion of the web 14 of the member 13 and abuts thereagainst for welding or otherwise suitable securing together as indicated at 28. The upper-most edge portion of each plate 26 has a tab 29, the latter being disposed in abutting relationship and extending through a slit in the wall 14 in the region of the portion 21 as shown more particularly in Fig. 2. The tabs are preferably secured to the wall 14 by welding. The disposition of the plates 26 so that they lie across the line of shear forces tending to distort the cross member affords the maximum efficiency in bracing and rigidifying the latter member.

Referring to the form of the invention shown in Fig. 5, the cross member 11 is provided with a plurality of reinforcing plates 26' positioned in the region of the downwardly bowed end portion thereof. The plates 26' extend vertically from the upper and lower wall of the box cross member and also extend obliquely with respect to the frame structure so that they converge in a direction generally longitudinally of the latter. These plates are secured to the side walls 15 of the box in a manner similar to that illustrated for the plates in the Fig. 2 showing. The upper and lower edge portions of the plates 26' have a contour conforming to the contour of the adjacent portions of the upper and lower walls respectively of the box against which they abut. In this form of the invention, a substantial area of the cross member is braced, the bracing means lying across the plane of the shear forces tending to distort the cross member.

Figure 7:
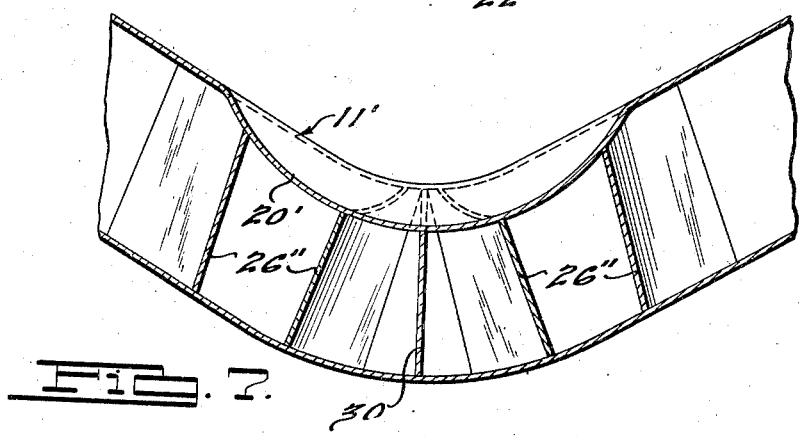
Fig. 7 is a vertical sectional view taken as indicated by the line 7—7 of Fig. 6.
Figure 6:
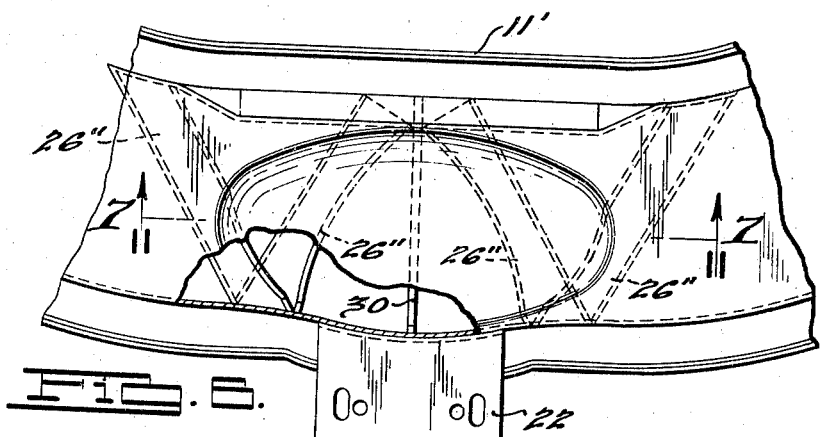
Fig. 6 is a view similar to Fig. 5 but illustrating a further modified form of the invention.

Referring to the form of the invention shown in Figs. 6 and 7, the cross brace 11' has a bowed portion 20' substantially mid way of the longitudinal extremities thereof. The portion 20' has a radius of curvature both lengthwise and crosswise. The cross member is reinforced in the region of the bowed portion by a plurality of plates 26'' which extend generally obliquely with respect to the frame structure. The plates are substantially perpendicular with respect to the upper and lower walls of the box as shown in Fig. 7 but due to the bow of the box in this region the plates are inclined relative to the vertical as shown in Fig. 6. A vertically disposed plate 30 extends generally longitudinally of the frame structure and transversely of the brace member so that one pair of plates 26'' is disposed on either side thereof. The plates 26' of each pair aforesaid converge in a direction generally longitudinally of the frame structure and adjacent the forwardly disposed side wall of the cross member and are secured thereto. The non-adjacent extremities of the plate are secured to the opposite side wall of the box. In this form of the invention, the upper-most wall of the box does not have the irregular contour provided by the portion 21 shown in the main form of the invention and the bracing effect provided by the portion 21 is supplied by the added number of plates 26'' plus the vertically disposed plate 30. The latter serves to reinforce the box against the collapse due to loads exerting a compressing force.

Although but several specific embodiments of the invention are herein shown and described, it will be understood that various changes in the size, shape and arrangement of parts may be effected without departing from the spirit of the invention.

I claim:

1. In a motor vehicle frame structure including transversely spaced longitudinally extending side rails, a cross member comprising a box-like structure connecting said rails and presenting a region adapted to receive a load downwardly thereon, and an inverted V-shaped brace structure extending between opposite walls of said structure, said brace structure having the apex thereof disposed in said region.

2. In a motor vehicle frame structure including transversely spaced longitudinally extending side rails, a cross member comprising a box-like structure connecting said rails and presenting a region adapted to receive a load downwardly thereon, and a pair of sheet metal plate-like members arranged in inverted V-formation disposed between and secured to vertically spaced walls of said box-like structure, the apex of said members being disposed substantially at said region.

3. In a motor vehicle frame structure including transversely spaced longitudinally extending side rails, a cross member comprising a box-like structure connecting said rails and presenting a region adapted to receive a load downwardly thereon, and reinforcing means for said box-like structure including a plurality of adjacently disposed opposite vertically inclined plate-like members extending substantially longitudinally of said frame and having the apex thereof disposed substantially at said region.

4. In a motor vehicle frame including transversely spaced longitudinally extending side rails, a cross member having a portion thereof comprising a box in cross section connecting said rails, said cross member being bowed in the region of said box portion, and brace means for said member including a pair of relatively angularly disposed plates extending between opposite walls of said box in the region of said bow, said plates extending substantially longitudinally of said frame.

5. In a motor vehicle frame including transversely spaced longitudinally extending side rails, a cross member having a portion thereof comprising a box in cross section connecting said rails, said cross member being bowed in the region of said box portion, and brace means for said member including a pair of relatively angularly disposed plates extending between opposite walls of said box in the region of said bow, said plates converging in a direction generally longitudinally of said frame.

6. In a motor vehicle frame including transversely spaced longitudinally extending side rails, means including a cross member connecting said rails, said member having vertically spaced wall portions, the upper one thereof having an opening therein, and brace means for said member including a plurality of relatively angularly disposed plates extending between said walls, said plates converging in a direction generally vertically of said frame and having abutting upper edge portions projecting into said opening.

7. In a motor vehicle frame including transversely spaced longitudinally extending side rails, means connecting said rails comprising a transversely extending box-like structure having spaced superimposed upper and lower walls, said box-like structure being bowed downwardly at its mid-portion, the uppermost wall of said superimposed walls having a shorter radius of curvature than the lowermost of said walls, and a plurality of plates extending between said walls and disposed in the region of said bowed mid-portion.

8. In a motor vehicle frame including transversely spaced longitudinally extending side rails, means including a cross member having a hollow section connecting said rails, and reinforcing means for said member including a substantially vertically disposed plate extending between opposite walls of said hollow section, said reinforcing means further including pairs of relatively angularly disposed members disposed on opposite sides respectively of said vertically disposed plate, the plates of each of said pairs converging in a direction generally longitudinally of said frame.

9. In a vehicle frame, a cross brace comprising a channel-shaped member having a substantially horizontally disposed web and depending side flanges, a plate-like member extending along the open side of said member and secured to the latter, and a plurality of vertically inclined plates disposed between and connected with said web and said plate-like member, said plates extending in a direction generally transversely with respect to said cross brace.

10. In a motor vehicle frame including transversely spaced longitudinally extending side rails, a cross member having a portion thereof comprising a box in cross section connecting said rails, said cross member having an offset load-receiving portion in the region of said box section, and brace means for said offset portion including a pair of plates arranged in inverted V-shaped formation and having the apex thereof disposed at said portion.

THOMAS E. M. WHEAT.